(No Model.)
B. T. MULLIGAN.
TYPE WRITER.
No. 333,080.
5 Sheets—Sheet 2.
Patented Dec. 22, 1885.
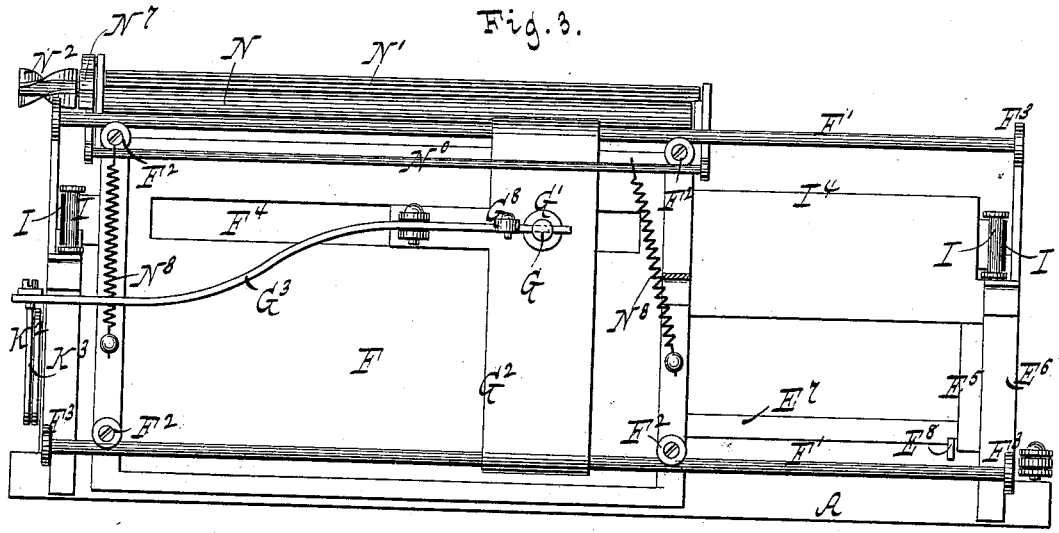
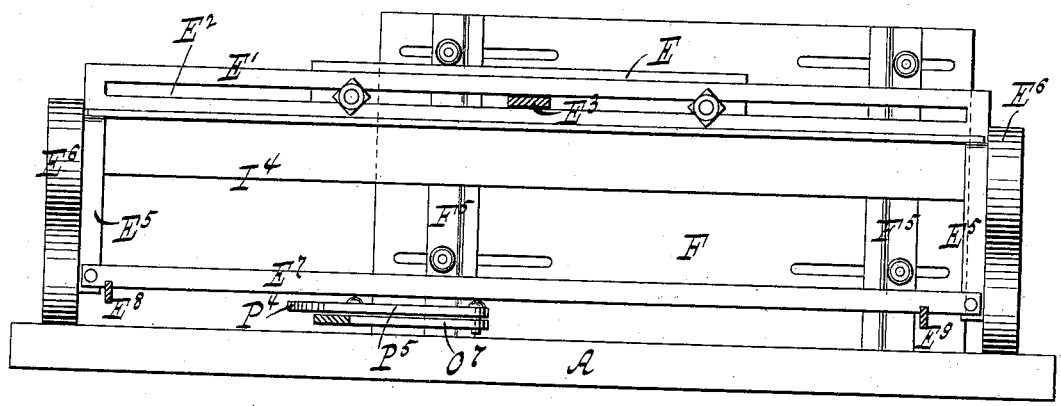
WITNESSES:
Chas. Wahlers.
William Miller
INVENTOR
Bartley T. Mulligan
BY Van Santvoord & Hauff
ATTORNEYS (No Model.) 5 Sheets—Sheet 3.

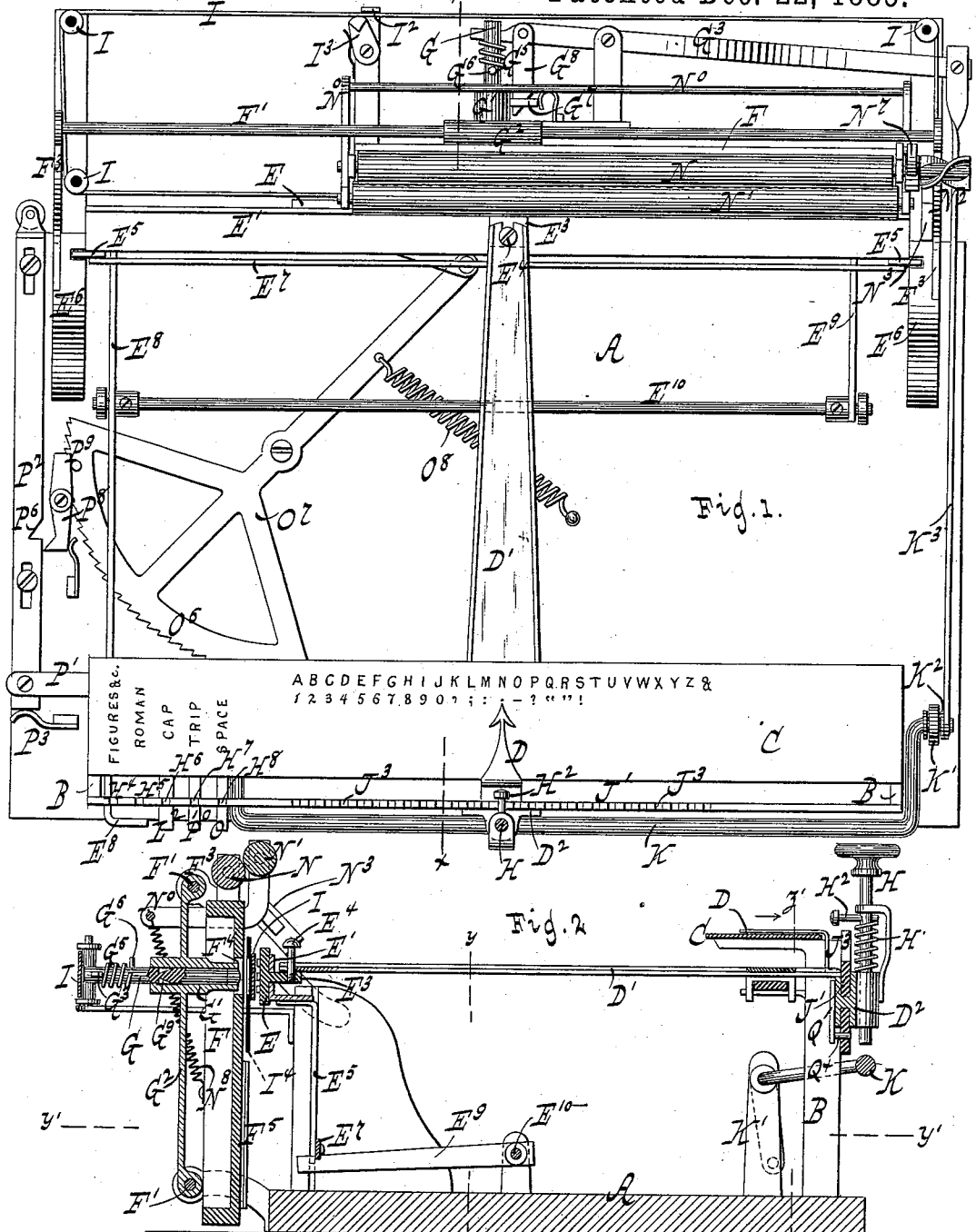

B. T. MULLIGAN.
TYPE WRITER.

No. 333,080. Patented Dec. 22, 1885.

WITNESSES:
Chas. Wahlers.
William Miller.

INVENTOR
Bartley T. Mulligan
BY Van Santvoord & Hauff
ATTORNEYS (No Model.)

B. T. MULLIGAN.
TYPE WRITER.

No. 333,080. Patented Dec. 22, 1885.

WITNESSES:
Chas. Wahlers.
William Miller.

INVENTOR
Bartley T. Mulligan
BY
Van Santvoord & Hauff
ATTORNEYS (No Model.)

B. T. MULLIGAN.
TYPE WRITER.

No. 333,080. Patented Dec. 22, 1885.

WITNESSES:

INVENTOR
Bartley T. Mulligan
BY Van Santvoord & Hauff
ATTORNEYS

UNITED STATES PATENT OFFICE.

BARTLEY T. MULLIGAN, OF BROOKLYN, NEW YORK.

TYPE-WRITER.

SPECIFICATION forming part of Letters Patent No. 333,080, dated December 22, 1885.

Application filed January 24, 1883. Renewed August 18, 1885. Serial No. 174,773. (No model.)

*To all whom it may concern:*

Be it known that I, BARTLEY T. MULLIGAN, a citizen of the United States, residing at Brooklyn, in the county of Kings and State of New York, have invented new and useful Improvements in Type-Writers, of which the following is a specification.

This invention relates to a type-writer containing a stationary scale or sign-board, a movable index concomitant to the scale, a type-form connected with the index to share its movement, a carriage containing the paper, a hammer, a single key, an inking device, and mechanism for transmitting motion from the key to the paper-carriage, to the inking device, and to the hammer, so that by adjusting the index to the stationary scale the required type is brought in position, and by depressing the key the paper-carriage is advanced and the hammer is caused to strike against the back of the paper, thus producing the desired impression.

The details in the construction of my typewriter are pointed out in the following specification and illustrated in the accompanying drawings, in which—

Figure 5:
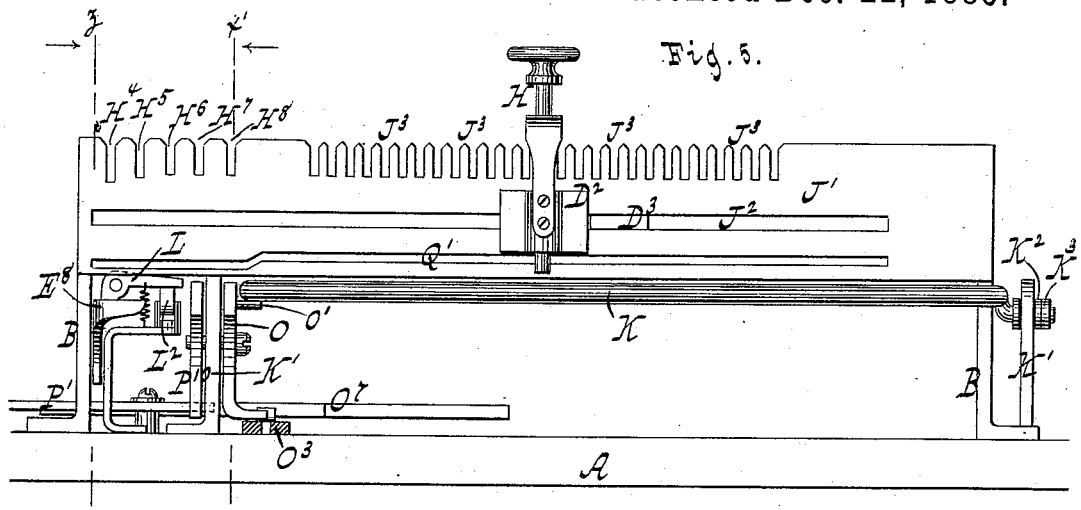
Figures 6, 7:
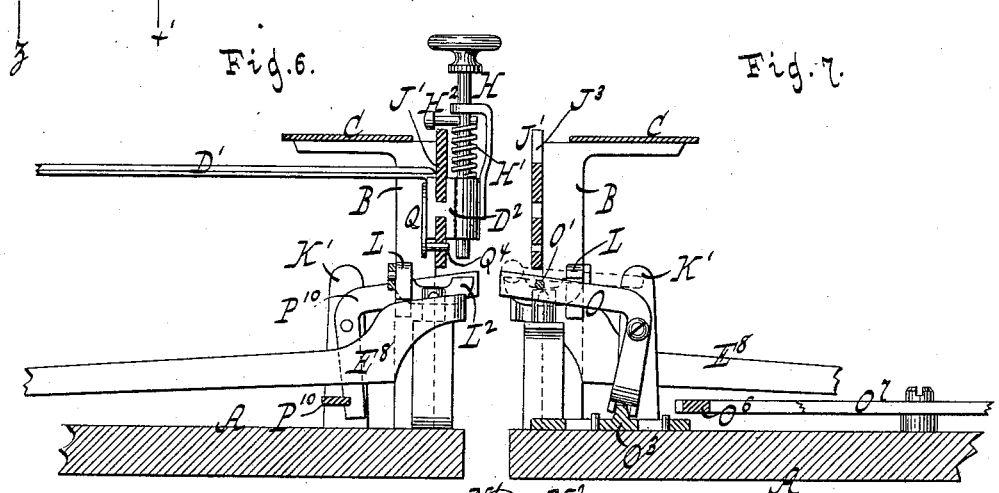
Figure 8:
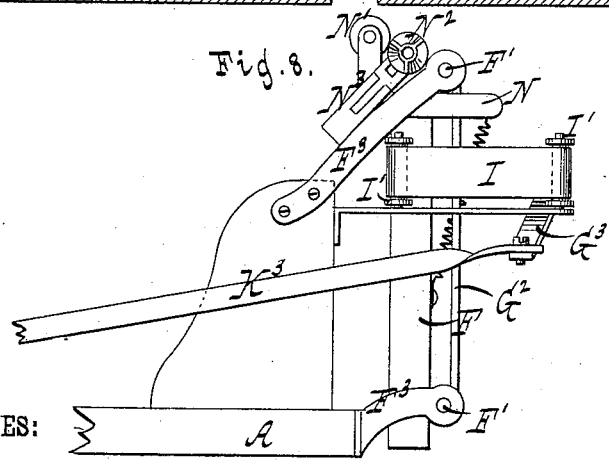
Figure 9:
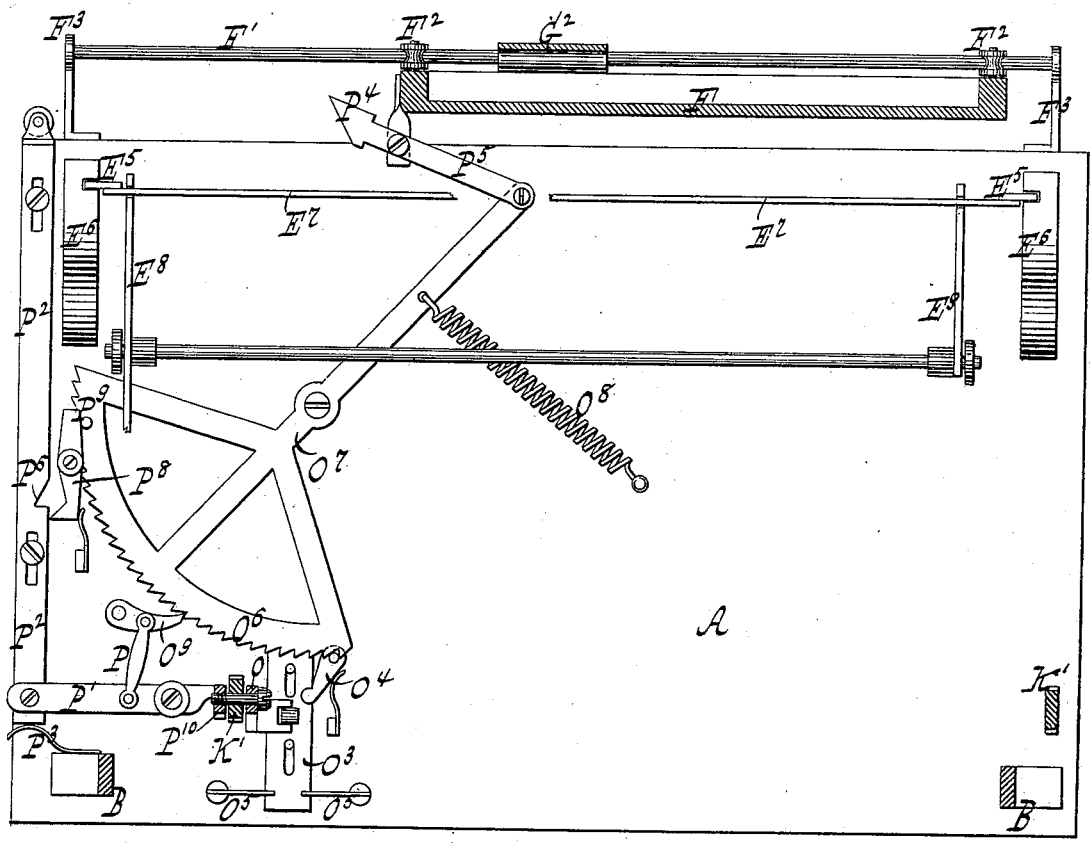
Figure 10:
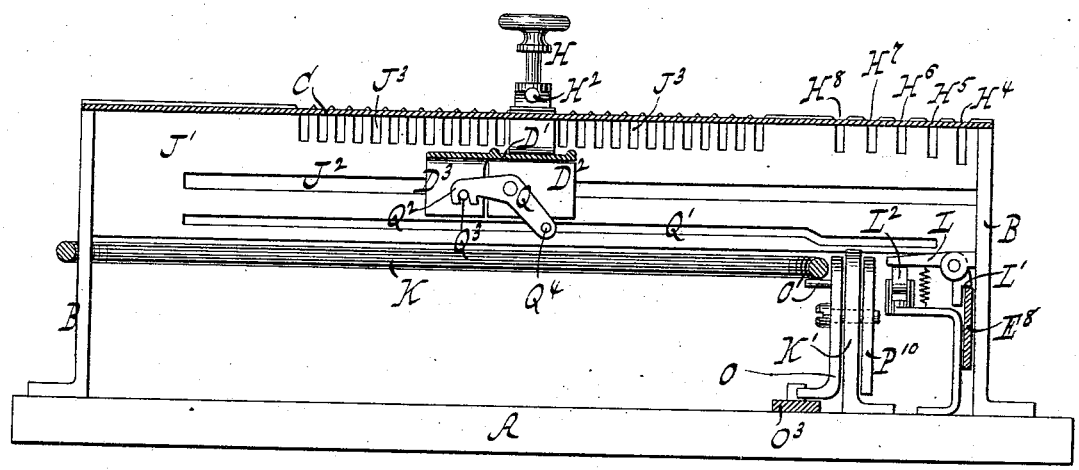

Figure 1 represents a plan or top view. Fig. 2 is a longitudinal vertical section in the plane $x\ x$, Fig. 1. Fig. 3 is a rear elevation. Fig. 4 is a transverse vertical section in the plane $y\ y$, Fig. 2. Fig. 5 is a front elevation. Fig. 6 is a partial longitudinal vertical section in the plane $z\ z$, Fig. 5. Fig. 7 is a similar section in the plane indicated by the line $x'\ x'$, Fig. 5, and looking in the direction of the arrow opposite to that line. Fig. 8 is a side elevation of part of my machine, showing the rear portion of the mechanism occupying the right-hand side of the sheet in Fig. 1, and the left-hand side of the sheet in Fig. 3. Fig. 9 is a horizontal section in the plane $y'\ y'$, Fig. 2. Fig. 10 is a transverse vertical section in the plane indicated by the line $z'\ z'$, Fig. 2, and looking in the direction of the arrow opposite to that line. The remaining figures are details, which will be referred to as the description progresses.

Similar letters indicate corresponding parts.

In these drawings the letter A designates the base or bed plate which supports the working parts of my machine. From this base, near its front edge, rise standards B, which support the scale or sign-board C, the latter being marked with the letters of the alphabet, figures, spaces, and other characters that may be contained in the type-form or that may be necessary to the proper operation of the machine, as shown in Fig. 1, said characters of the sign-board corresponding in position to those of the type-form.

The letter D refers to the index; E, the type-form; F, the paper-carriage; G, the hammer; H, the key, and I the inking device. The index D is attached to an arm, D', which forms the connection between it and the type-form E, and it is bent over the front edge of the scale C, so as to point to the letters or other characters thereon. The arm D' projects rearwardly from a horizontal slide, $D^2$, working on a guide-plate, J', so that this slide carries the index and is a medium for adjusting it to the desired position on the scale C, the guide-plate being secured to the standards B, parallel to the scale, and being provided with a longitudinal slot, $J^2$, Fig. 10, to receive the slide. The type-form E works on a guide-bar, E', which is parallel to the scale C and provided with a slot, $E^2$, Fig. 4, to receive the form, and the form being, as stated, connected to the index D, it shares the motion of the index, and can thereby be adjusted for bringing the desired type into position for printing. On the back of the type-form E is a lug, $E^3$, which projects through the slot $E^2$ of the guide-bar and carries a stud, $E^4$, by which it engages the connecting-arm D' of the index. The paper-carriage F moves on guide-rails F' by means of rollers $F^2$, Fig. 3, which rails are fixed to arms $F^3$ projecting from the base A. In the carriage F is a longitudinal slot or opening, $F^4$, which is opposite to the type-form E and also to the hammer G, the form being in front and the hammer in rear of the carriage, so that the hammer may pass through the slot and strike the form, its movement being properly regulated to the purpose last named. Said hammer G moves in a guide, G', of tubular form, which is secured to a web, $G^2$, fixed to the rails F', the whole being arranged approximately in the center of the machine. Upon the front of the carriage F are vertical guides $F^5$ for the sheet or web of paper to be written on, they being adjustable laterally to the edges of the sheet. The inking device I extends in form of an endless ribbon over rollers I', in front and along the back of the carriage F and in the horizontal plane of the slot F⁴, so that a portion of the ribbon is interposed between the hammer G and the type-form. The sheet of paper passes downward in front of the carriage F, between it and the inking-ribbon I, and when the hammer G advances, it forces the sheet, together with the inking-ribbon, against the face of the type-form, whereby the desired impression is made. The sheet of paper is protected against contact with the inking-ribbon under normal conditions by a shield, I⁴, having a hole for the passage of the hammer. That portion of the inking-ribbon I extending in rear of the paper-carriage is exposed to the action of clamping-jaws I² I³, which are attached to the carriage and close upon the ribbon in the advance movement of the carriage, so that the ribbon obtains an intermittent movement, and a fresh portion thereof is presented to the hammer after each impression. The key H is arranged to slide vertically on the horizontal slide D² in front of the guide-plate J', and may be taken hold of for the purpose of adjusting the index D to the scale. On the shank of said key is coiled a spring, H', which acts thereon with a tendency to force it upward, and when the key is depressed its lower end comes in contact with the traverse of a swinging yoke, K, which is hung in posts K', said traverse being in the vertical plane of the key, and which is connected at one end by an arm, K², and rod K³ to a horizontal lever, G³, which in turn is connected to the hammer G, so that by the action of the key on said yoke the hammer is driven forward.

Figure 11:
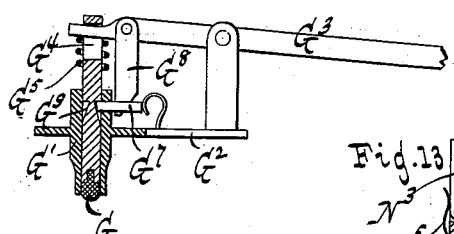

The best action of the hammer G is obtained by causing it to strike a quick sharp blow, and to this end it is connected with the lever G³ in the following manner: In the rear part of the hammer is a longitudinal slot, G⁴, Fig. 11, into and through which the hammer-lever projects at one end, and on the hammer is coiled a spring, G⁵, which is intermediate of said lever and a stop in form of a spur, G⁶, on the hammer. Through the hammer-guide G', moreover, extends radially a spring-bolt, G⁷, while to the hammer-lever is attached by a suitable pivot a wedge, G⁸, which enters a slot in the bolt, and when the machine is at rest the bolt catches in a groove, G⁹, in the hammer, thus locking it in position. When, however, the hammer-lever G³ is actuated, as before stated, the hammer-spring G⁵ is thereby compressed in the direction of the movement of the hammer. The bolt G⁷ is then retracted by the action of the wedge G⁸, so as to release the hammer, and the latter is driven forward by the action of the spring.

In the upper edge of the guide-plate J' are a series of vertical slots or notches, J³, which are opposite to the letters or other characters on the sign-board C, they being equal in number to the largest number of characters in any row, and the key H is provided with a bit, H², which enters either of such notches when the key is depressed, so that the key is guided by that means, and the type-form is not only brought to but held in the proper position relatively to the hammer during the printing operation.

The face of the type-form E is provided with three (more or less) horizontal rows of types—as, for example, a top row of capital letters, a second row of Roman letters, and a third or lower row of figures—together with punctuation-marks, as shown in Fig. 2, for the purpose of shortening the form; and to permit either of such rows to be brought into alignment the type-form is made adjustable in a vertical direction, this purpose being accomplished in the following manner: The guide-bar E' of the type-form is supported by a frame composed of vertical slides, E⁵, which are guided in standards E⁶, and of a cross-bar, E⁷, which rests on levers E⁸ E⁹, having their fulcra on a rock-shaft, E¹⁰, to which they are fixed. The lever E⁸ extends under and beyond the guide-plate J', and is bent laterally at the outer end in the vertical plane of the key H, or it may be provided with a lateral attachment at that place, so that when the key is depressed it displaces said lever, and through the rock-shaft E¹⁰ the lever E⁹, while both levers act on the supporting-frame E⁶ E⁷ to lift the type-form. The position of the type-form is determined by a gravitating stop-lever, L, of elbow shape, (best seen in Fig. 10,) which is hung to one of the standards B at a right angle to the adjusting-lever E⁸, and the short arm of which is provided with a toe, L', on the edge adjacent to the adjusting-lever, while its long arm rests on a releasing-lever, L², which extends parallel to the adjusting-lever E⁸ into the path of the key H. When the type-form is lifted to its highest position, the stop-lever L engages the adjusting-lever E⁸ by means of its lower end, while when the form is lifted to its intermediate position the stop-lever engages the adjusting-lever by means of its toe L', as shown. When it is desired to drop the form, the key H is depressed to act on the releasing-lever L², when the latter acts on the long arm of the stop-lever L to throw its short arm away from the adjusting-lever E⁸, thus freeing the form. Above or opposite to the bent end of the adjusting-lever E⁸ the guide-plate J' has two vertical slots or notches, H⁴ H⁵, of uneven depth, and if, when the key is depressed to act on the adjusting-lever, it is set to cause the bit H² to enter either of such notches, the extent of movement of the key is thereby properly regulated. Said edge of the guide-plate has also a notch, H⁶, to guide the key in its action on the releasing-lever L².

On the upper part of the paper-carriage F are arranged, in superficial contact with each other, two rollers, N N', the roller N being in fixed bearings, and the roller N' in a swinging frame, N⁰, which is hung to the carriage, and to which are connected springs $N^8$, acting thereon with a tendency to press the roller $N'$ against the roller N. The sheet of paper passes between the rollers N N', and is fed or advanced automatically in each return movement of the paper-carriage by the action of the roller N—that is to say, said roller obtains an intermittent revolving motion occurring at the proper intervals—by the following means: To the shaft of said feed-roller N is fixed a propelling-screw, $N^2$, having three (more or less) blades, this screw being located at or beyond the rear end of the paper-carriage, and on a suitable part of the machine-frame is arranged a fork, $N^3$, which receives in it one of the blades of the screw in the return movement of the carriage, so that the screw follows the path of said blade, and it being thus revolved a like motion is imparted to the feed-roller.

Figure 12:
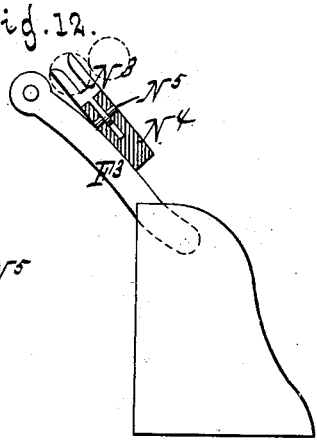
Figure 13:
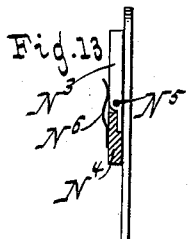

In the advance movement of the paper-carriage it is essential that the fork $N^3$ shall yield to and allow the screw $N^2$ to clear it, in order to avoid the tendency to a back movement of the feed-roller, and to this end said fork is hung to a supporting-arm, $N^4$, by a pivot, $N^5$, Figs. 12 and 13, and is subjected to the action of a spring, $N^6$, having a tendency to throw it outward or away from the paper-carriage to an upright position, such position being determined by the contact of the shank of the fork with the supporting-arm, so that while the fork retains a fixed position in the thrust of the screw it swings back on the pivot $N^5$ against the spring $N^6$ in the return of the screw, until the screw releases it, when the fork is brought back to a normal position by the spring. A pawl and ratchet, $N^7$, Fig. 1, prevent a back motion of the feed-roller.

The motion of the paper-carriage is produced in the following manner: Adjacent to one end of the yoke K is arranged a space-lever, O, one arm of which is provided with a spur, $O'$, Figs. 5 and 7, catching under the yoke, so that in each impulse of the yoke by the key H the space-lever thence obtains an oscillating motion. Said space-lever O is hung to one of the posts $K'$, and engages at the lower end a reciprocating pawl-arm, $O^3$, (best seen in Fig. 9,) which carries a spring-pawl, $O^4$, and is furnished with a return spring or springs, $O^5$. The pawl $O^4$ engages a toothed segment, $O^6$, forming one end of a horizontal lever, $O^7$, the other end of which is connected to the paper-carriage F, so that in the motions of the reciprocating pawl-arm $O^3$ due to the action of the space-lever O, an intermittent motion is imparted to the lever and thence to the paper-carriage. The motion of the space-lever O can also be produced by the direct action of the key, independently of the yoke K, due to the position of the spur O, it being beneath the yoke. With said propelling-lever $O^7$ is combined a return-spring, $O^8$, and a stop-pawl, $O^9$, which latter under normal conditions counteracts the spring, but which is automatically thrown out of gear to release the propelling lever and allow it, together with the paper-carriage, to follow the action of the spring at the completion of the advance movement of the carriage by the following means: The stop-pawl is connected by means of a link, P, to a retracting-lever, $P'$, which in turn is connected to a horizontal slide, $P^2$, furnished with an impelling-spring, $P^3$. The slide $P^2$ extends at one end into the path of a wedge, $P^4$, where it is provided with an anti-friction roller, such wedge forming one end of a lever, $P^5$, by which the propelling-lever $O^7$ is connected to the paper-carriage. Said slide $P^2$, moreover, is provided with a notch, $P^6$, in one of its longitudinal edges, adapted to receive in it one end of a pivoted spring-latch, $P^8$, the other end of which is in the path of a trip-pin, $P^9$, applied to the propelling-lever $O^7$. In the advance movement of the paper-carriage the wedge $P^4$ comes in contact with the roller end of the slide $P^2$, and forces the latter back against the action of its spring $P^3$, when the latch $P^8$ catches into the notch $P^6$ of the slide and locks it firmly in the rear or retracted position. As the slide $P^2$ is forced back, it acts on the retracting-lever $P'$, to swing the same in the proper direction for throwing the stop-pawl $O^9$ out of gear, and the propelling-lever $O^7$ being thus set free, it and the paper-carriage are returned to the starting-point. In this movement of said lever $O^7$ the trip-pin $P^9$ strikes the latch $P^8$ and throws it out of engagement with the notch $P^6$, as shown in Fig. 9, whereby the slide $P^2$ is set free, and it moving forward under the impulse of the spring $P^3$ the stop-pawl $O^9$ is thereby again thrown into gear. The pawl-retracting lever $P'$ can also be actuated by hand—namely, from the key H, by a trip-lever, $P^{10}$, which is hung to the post $K'$, having the space-lever O, and engages said retracting-lever, while it, together with the space-lever, extends in to or past the line of the key H, as shown in Figs. 5 and 6, so that by depressing the key at the proper places either the space-lever or the trip-lever can be actuated by its means. Vertical slots or notches $H^7 H^8$ in the upper edge of the guide-plate $J'$ serve to guide the key in its action on the space-lever O and the trip-lever. The notches $H^4$ to $H^8$, inclusive, are located near one end of the guide-plate $J'$, and when in the movement of the key H toward these notches it passes beyond the series of notches $J^3$, the slide $D^2$ becomes automatically disengaged from the arm $D'$ of the index, thus leaving the index stationary, while when such slide again approaches the notches $J^3$ it re-engages said arm, causing the index again to share its motion. The effect last referred to is accomplished by means of an independent slide, $D^3$, (best seen in Fig. 10,) supporting the index-arm $D'$, a pivoted latch, Q, arranged on the rear part of the main slide, $D^2$, and a cam-slot, $Q'$, in the guide-plate $J'$, said latch being provided at one end with a hook, $Q^2$, adapted to engage a stud, $Q^3$, on the independent slide, and at the other end with a spur, $Q^4$, working in the cam-slot. Said cam-slot Q' is sunken opposite to the notches H⁴, &c., it being parallel to the guide-slot J², and of proper length to permit the movement of the parts, and when the spur Q⁴ of the latch enters the higher part of the cam-slot, the latch is adjusted to catch the stud Q³ by means of its hook, as shown in Fig. 10, while when said spur enters the lower part of the cam-slot the latch is adjusted to clear the stud. If desired, however, two keys may be used, one to the series of notches J³ and the other to the notches H⁴, &c., and in that case the latch and cam-slot are omitted.

For the purpose of facilitating the adjustment of the key H to the lever-notches H⁴, &c., the sign-board is marked opposite to said notches, as shown in Fig. 2, in the proper manner to indicate the nature of the levers which are actuated by the key when it is depressed in said notches.

What I claim as new, and desire to secure by Letters Patent, is—

1. The combination, substantially as hereinbefore set forth, with the paper-carriage, of the feed-roller, the presser-roller, a propelling-screw upon the shaft of the feed-roll, and a device engaging with one of the blades of said screw, said devices operating to impart a forward motion to the feed-roller in each return movement of the carriage, for the purpose of automatically advancing the paper.

2. The combination, substantially as hereinbefore set forth, with the paper-carriage, of the feed-roller, the pressure-roller, the propelling-screw fixed to the shaft of the feed-roller, and the yielding fork arranged on the machine-frame to receive in it the proper blade of the screw in the return movement of the carriage.

3. The combination, substantially as hereinbefore set forth, with the paper-carriage, its return-spring, and the carriage-propelling devices, of a trip mechanism consisting of a pawl connected by a link with a tripping-lever, a spring-impelled slide which actuates said lever, and a latch automatically engaged with and disengaged from said slide, whereby the carriage is automatically released in its advance movement and allowed to follow the action of said spring.

4. The combination, substantially as hereinbefore set forth, of the stationary scale, the horizontal slide D², carrying the index, the guide-plate J', supporting the horizontal slide, the type-form, and the rearwardly-projecting arm D' of the slide connecting the type-form with the index.

5. The combination, substantially as hereinbefore set forth, of the stationary scale, the movable index, the vertically-adjustable type-form connected to the index, the paper-carriage, the inking-ribbon, and the clamping-jaws I² I³, attached to the paper-carriage for imparting an intermittent movement to the inking-ribbon, and means for adjusting the type-form to bring any line of type into alignment, as set forth.

6. The combination, substantially as hereinbefore set forth, of the stationary scale, the index, the key, the horizontal slide D², carrying the index and key, the swinging yoke K, having its traverse arranged in the vertical plane of the key, the hammer, the hammer-lever G³, and the connections between the yoke and the hammer-lever.

7. The combination, substantially as hereinbefore set forth, of the hammer, the stop G⁶, the hammer-lever projecting at one end into a longitudinal slot of the hammer, the spring G⁵, intermediate of said stop and the hammer-lever, the tubular guide G⁷, for the hammer, the spring-bolt G⁷ on said guide, adapted to engage the hammer, and the bolt-retracting wedge G⁸, attached to the hammer-lever.

8. The combination, substantially as hereinbefore set forth, of the stationary scale, the index, the key having the bit H², the horizontal slide D², carrying the index and key, and the guide-plate J' of the horizontal slide having the notches J³ to receive the bit of the key.

9. The combination, substantially as hereinbefore described, of the type-form, the guide-bar E' of the type-form, the vertically-movable frame supporting said guide-bar, the frame-adjusting levers E⁸ E⁹, one having its outer end bent in the vertical plane of the key, the stop-lever L, having the toe L', the releasing-lever L², engaging the stop-lever, and the key adapted to actuate the bent adjusting-lever and the releasing-lever.

10. The combination, substantially as hereinbefore set forth, of the type-form, the guide-bar E' of the type-form, the vertically-movable frame supporting said guide-bar, the frame-adjusting levers E⁸ E⁹, one having its outer end bent in the vertical plane of the key, the stop-lever L, having the toe L', the releasing-lever L², engaging the stop-lever, the key having the bit H², the horizontal slide D², carrying the key, and the guide-plate J' of the horizontal slide having the notches H⁴ H⁵ H⁶, to receive the bit of the key in the action of the key on the bent adjusting-lever and the releasing-lever.

11. The combination, substantially as hereinbefore set forth, of the swinging yoke K, the space-lever O, having the spur O', catching under the yoke, the reciprocating pawl-arm O³, engaging the space-lever O⁷, having at one end the toothed segment O⁶, to engage the pawl O⁴ of the pawl-arm, and the return-spring O⁸ and stop-pawl O⁹ of the propelling-lever.

12. The combination, substantially as hereinbefore set forth, of the swinging yoke K, the space-lever O, having the spur O', catching under the yoke, the reciprocating pawl-arm O³, engaging the space-lever, the carriage-propelling lever O⁷, having the toothed segment O⁶, to engage the pawl O⁴ of the pawl-arm, the return-spring O⁸ and stop-pawl O⁹ of the propelling-lever, the key having the bit $H^2$, the horizontal slide, and the guide-plate $J'$ of the horizontal slide, having the notch $H^8$, to receive the bit of the key in the action of the key on the space-lever.

13. The combination, substantially as hereinbefore set forth, of the paper-carriage, the carriage-propelling lever having the toothed segment $O^6$ and trip-pin $P^9$, the spring-impelled slide $P^2$, having the notch $P^6$, the connecting-lever $P^5$, between the propelling-lever and paper-carriage, having the wedge $P^4$, for retracting the slide, the spring-latch $P^8$, adapted to engage said notch of the slide, for locking the latter in its rear position, and further adapted to be withdrawn from the notch by the action of said trip-pin of the locking-lever, the return-spring $O^8$ and stop-pawl $O^9$ of the propelling-lever, and the pawl-retracting lever $P'$, connected to the slide and to the stop-pawl.

14. The combination, substantially as hereinbefore set forth, of the paper-carriage, the carriage-propelling lever having the toothed segment $O^6$ and trip-pin $P^9$, the spring-impelled slide $P^2$, having the notch $P^6$, the connecting-lever $P^5$, between the propelling-lever and the paper-carriage, having the wedge $P^4$ for retracting the slide, the spring-latch $P^8$, adapted to engage said notch of the slide for locking the latter in its rear position, and further adapted to be withdrawn from the notch by the action of said trip-pin of the locking-lever, the return-spring $O^8$ and stop-pawl $O^9$ of the propelling-lever, the pawl-retracting lever $P'$, connected to the slide and to the stop-pawl, the trip-lever $P^{10}$, for actuating the retracting-lever, the key $H$, having the bit $H^2$, the horizontal slide $D^2$, carrying the key, and the guide-plate $J'$ of the horizontal slide, having the notch $H^7$ to receive the bit of the key in the action of the key on the trip-lever.

15. The combination, substantially as hereinbefore set forth, of the horizontal slide $D^2$, the guide-plate $J'$ of said slide, having two sets of notches, $J^3$ and $H^4$, &c., and the cam-slot $Q'$, and the independent slide $D^3$, supporting the index-arm, and having the stud $Q^3$ and the the latch $Q$ hung to said horizontal slide, and having the spur $Q^4$, whereby it engages said cam-slot.

In testimony whereof I have hereunto set my hand and seal in the presence of two subscribing witnesses.

BARTLEY T. MULLIGAN. [L. S.]

Witnesses:
W. HAUFF,
CHAS. WAHLERS.